Aug. 29, 1933.  R. N. VAN BUSKIRK  1,924,577
BRAKE
Filed July 27, 1928  2 Sheets-Sheet 1

INVENTOR
ROBERT N. VAN BUSKIRK
BY
*M. W. McConkey*
ATTORNEY

Aug. 29, 1933.  R. N. VAN BUSKIRK  1,924,577
BRAKE
Filed July 27, 1928  2 Sheets-Sheet 2
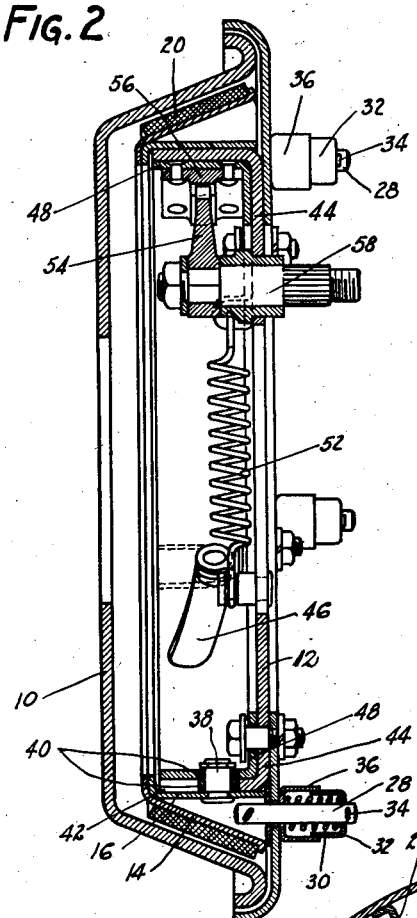
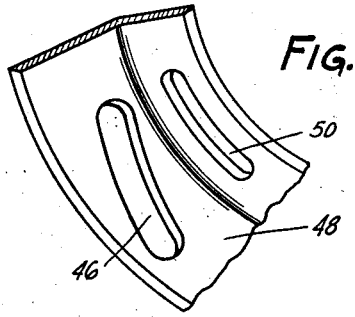
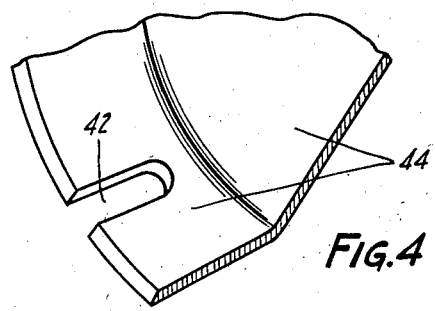
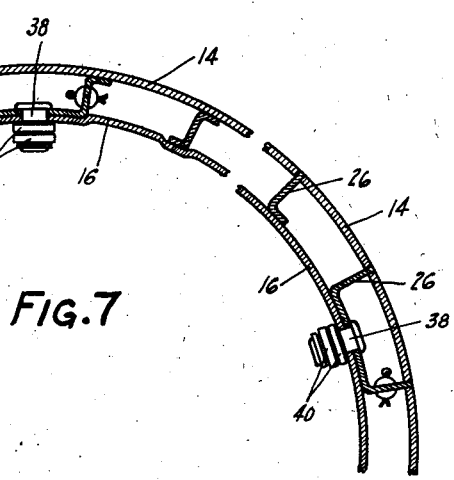
INVENTOR
ROBERT N. VAN BUSKIRK
BY
ATTORNEY Patented Aug. 29, 1933

1,924,577

UNITED STATES PATENT OFFICE 1,924,577

BRAKE

Robert N. Van Buskirk, Detroit, Mich., assignor to Bendix Brake Company, South Bend, Ind., a corporation of Illinois Application July 27, 1928. Serial No. 295,678

13 Claims. (Cl. 188—71)

This invention relates to brakes, and is illustrated as embodied in an internal brake of the type in which the friction element moves axially to its active position. Preferably the friction element is conical in form, at least outwardly, and it may if desired be built up as described below from sheet metal stampings.

An important feature of the invention relates to the provision of novel means for preventing angular movement of the friction element and therefore taking the braking torque, and for moving the friction element axially to apply the brake. In one desirable arrangement, this is accomplished by two novel ring-shaped elements arranged inside the friction element, and shown as having pin and slot connection therewith. The slots in the anchor element extend parallel to the brake axis, while the slots in the operating element are inclined to form cam surfaces which apply the brake.

Other objects and features of the invention, including a novel arrangement of the brake return springs, and other desirable structural details, will be apparent from the following description of one illustrative embodiment shown in the accompanying drawings, in which:

Figure 2 is a vertical central section through the brake on the line 2—2 of Figure 1;

Figure 3 is a perspective of a portion of the operating element, showing one of the inclined cam slots;

Figure 4 is a similar perspective of a portion of the anchor element, showing one of the anchor slots;

Figure 7 is a partial section through a modified form of friction element, in the same plane as Figure 1.

The illustrated embodiment of the brake includes a rotatable brake drum 10, having a conical braking flange rolled outwardly at its free edges to stiffen it. A backing plate or other support 12 is arranged at the open side of the drum.

Figure 1:
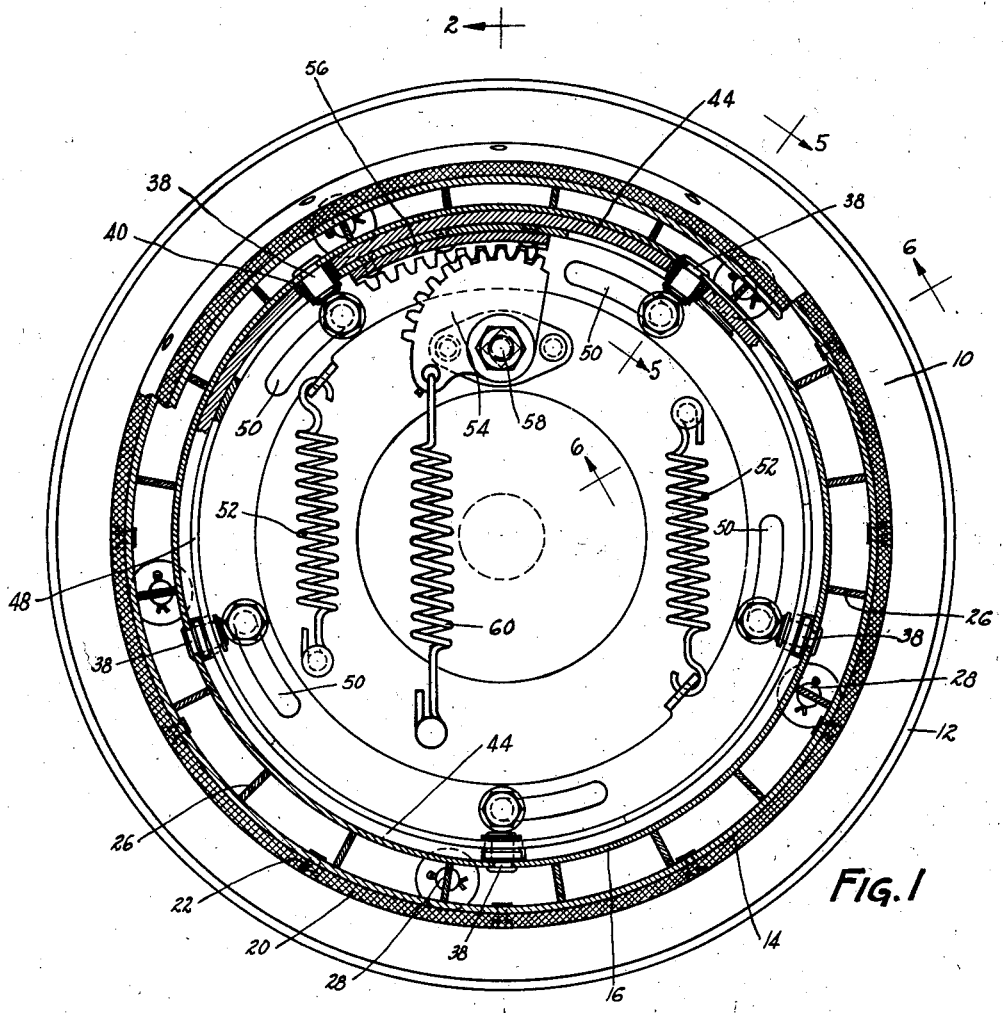
Figure 1 is a vertical section centrally through the brake, in a plane perpendicular to the brake axis with the brake drum removed.
Figures 5, 6:
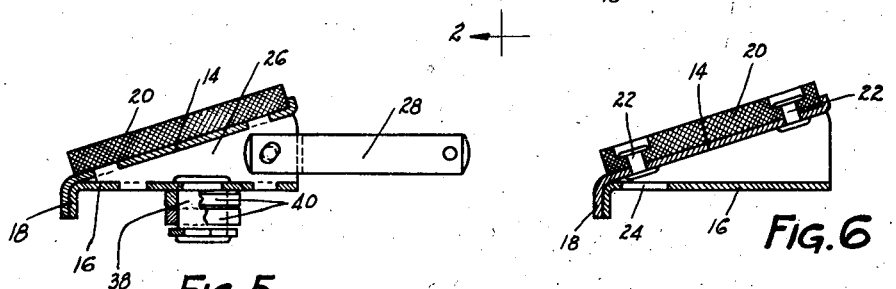
Figure 5 is a transverse section through the friction element, on the line 5—5 of Figure 1, and on a larger scale than Figure 2.
Figure 6 is a similar transverse section through the friction element, on the line 6—6 of Figure 1.

Within the drum is a novel friction element, preferably including a ring-shaped conical outer part 14 formed of sheet metal and a ring-shaped cylindrical inner part 16 also formed of sheet metal; and which may be spot-welded at 18 to the outer part. The brake lining 20 is secured to the outer part 14 by means such as rivets 22, openings 24 being punched in the part 16 to facilitate the insertion of the rivets. Suitable stamped sheet metal reinforcing pieces 26 may be secured between the parts 14 and 16, various methods of arranging these pieces being shown in Figures 1 and 7.

Plungers 28 are shown pinned at their ends to the reinforcing pieces 26, and extending through openings in the backing plate. The return springs 30 of the brake, which urge the friction element toward its released position away from the drum, are sleeved on these plungers and confined between stampings 32 held on the ends of the plungers by means such as cotter pins 34, and stampings 36 engaging the backing plate. Stampings 32 and 36 are shown as being cup-shaped and forming housings for the return springs.

The brake friction element is provided with a series of inwardly-extending pins 38, shown riveted permanently to part 16, and if desired provided with antifriction rollers 40. These pins extend through anchor slots 42; parallel to the axis of the brake, in a ring-shaped stamping or anchor member 44 having an attaching flange bolted or otherwise secured to the backing plate 12, and shown extended toward the axis of the brake to form in effect a part of the backing plate.

Pins 38 also extend through inclined cam slots 46 in a ring-shaped stamping or operating member 48, which may have a supporting flange engaging the attaching flange of the anchor member 44 and be formed with retaining slots 50 embracing the attaching bolts of the anchor member. It will be seen that angular movement of the operating member 48 will move the friction element axially to apply the brake.

The operating member 48 is operated to apply the brake, against the resistance of return springs 52, by a segmental pinion 54 meshing with a rack 56 secured to the member 48. Pinion 54 is secured in any desired manner on an operating shaft 58 journaled in a bracket secured to the backing plate, and may if desired have its own return spring 60.

While one illustrative embodiment has been described in detail, it is not my intention to limit the scope of the invention to that particular embodiment, or otherwise than by the terms of the appended claims.

I claim:

1. A brake comprising, in combination, a drum having a conical braking surface, a conical friction element within the drum engageable with said surface, a stationary ring-shaped element adjacent the friction element, said two elements having pin-and-slot interconnection preventing angular movement of the friction element but permitting axial movement thereof, and means for moving the friction element axially to apply the brake.

2. A brake comprising, in combination, a drum having a conical braking surface, a friction element within the drum having an outer conical surface engageable with the drum and having an inner cylindrical surface, a cylindrical ring within the friction element having a pin-and-slot connection therewith preventing angular movement, and means for moving the friction element axially to apply the brake.

3. A brake comprising, in combination, a drum having a conical braking surface, a friction element within the drum having an outer conical surface engageable with the drum, an angle sectional ring member within the friction element arranged to prevent angular movement thereof, reinforcing members connecting the friction element and ring member and means for moving the friction element axially to apply the brake.

4. A brake comprising, in combination, a drum having a conical braking surface, a friction element within the drum having an outer conical surface engageable with the drum and having an inner cylindrical surface, a cylindrical ring within the friction element having a pin-and-slot connection therewith preventing angular movement, and an angularly-movable ring within the friction element and connected therewith to apply the brake.

5. A brake comprising, in combination, a drum having a conical braking surface, a friction element within the drum having an outer conical surface engageable with the drum, means within the friction element arranged to prevent angular movement thereof, and an angularly-movable band within the friction element and connected therewith to apply the brake.

6. A brake having a band friction element, in combination with two other band elements having pin-and-slot connection therewith, one of which prevents angular movement of the friction element and the other of which moves the friction element axially to apply the brake.

7. A brake having a band friction element, in combination with two other band elements connected therewith, one of which prevents angular movement of the friction element and the other of which moves the friction element axially to apply the brake.

8. A brake friction element having a conical outer band portion formed of sheet metal, and an inner cylindrical ring-shaped portion formed of sheet metal and positioned within and secured to the outer portion.

9. A brake friction element having a conical outer portion formed of sheet metal, and an inner cylindrical band portion formed of sheet metal and secured to the outer portion, together with sheet metal reinforcements between and connecting the inner and outer portions.

10. An operating element for the described brake comprising an annular member having a flange provided with a series of diagonal cam slots.

11. A brake having, in combination, an axially-movable friction element, a backing plate, guide means upon said plate, a series of plungers secured to the friction element and extending through and beyond the plate, and a corresponding series of springs acting respectively on the several plungers to move the friction element toward its released position said springs being surrounded by said guide means.

12. A brake having, in combination, an axially-movable friction element, a backing plate, guide means upon said plate, means secured to the friction element and extending through the plate, and springs tensioned between said means and the plate to move the friction element toward its released position said springs being surrounded by said guide means.

13. A brake having, in combination, an axially-movable friction element, a backing plate, a series of plungers secured to the friction element and extending through the plate, and a corresponding series of springs in engagement with the several plungers to move the friction element toward its released position.

ROBERT N. VAN BUSKIRK.